April 5, 1960

C. C. BLACKWELL 2,931,316

AUTOMOTIVE SERVICING DEVICE

Filed July 30, 1956

*INVENTOR:*
CHARLES C. BLACKWELL
BY Fulwider, Mattingly
& Huntley
*ATTORNEYS*

April 5, 1960
C. C. BLACKWELL
2,931,316
AUTOMOTIVE SERVICING DEVICE
Filed July 30, 1956
2 Sheets-Sheet 2
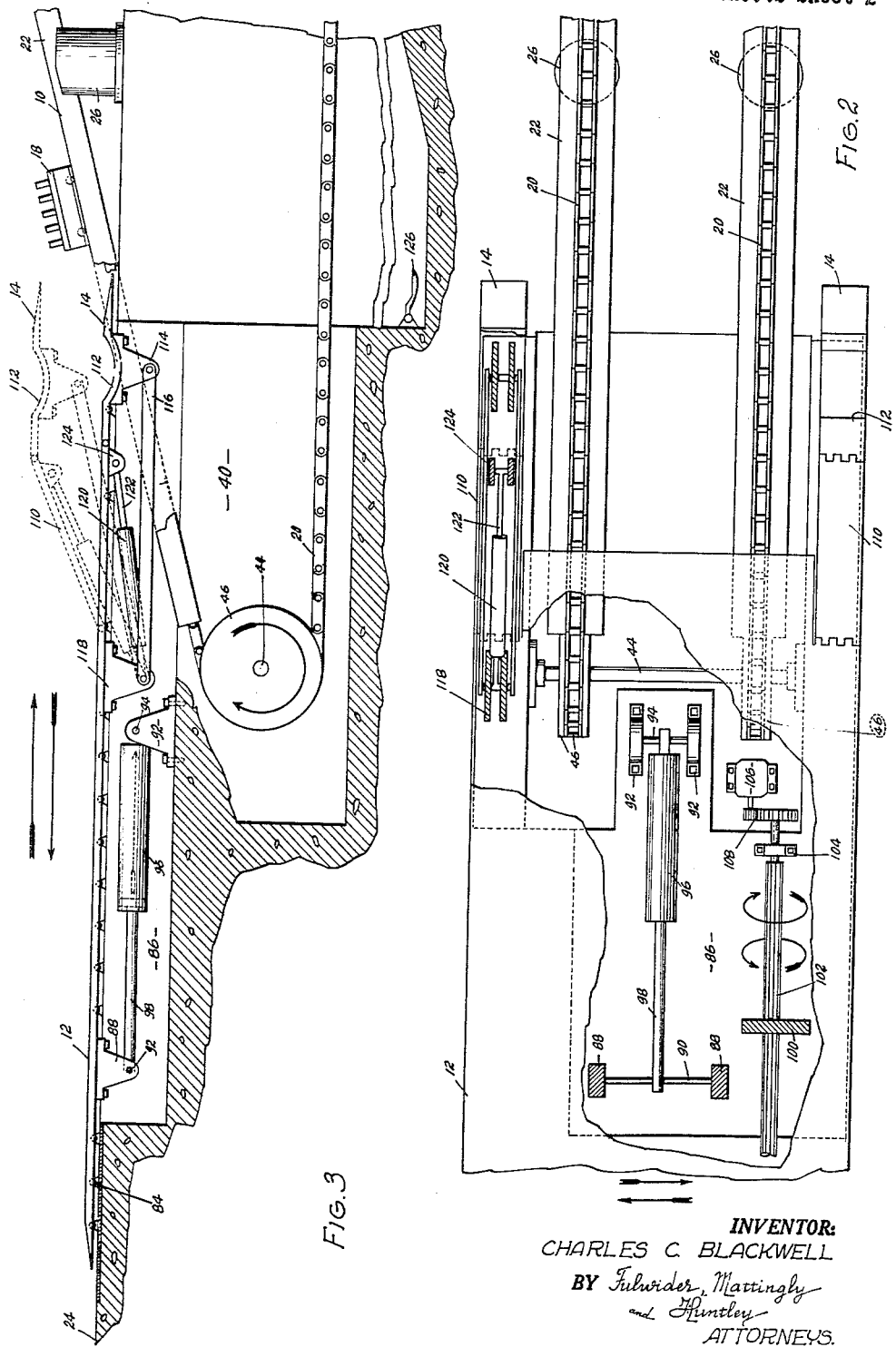
INVENTOR:
CHARLES C. BLACKWELL
BY Fulwider, Mattingly
and Huntley
ATTORNEYS.

United States Patent Office 2,931,316
Patented Apr. 5, 1960

2,931,316
AUTOMOTIVE SERVICING DEVICE

Charles C. Blackwell, Fullerton, Calif.

Application July 30, 1956, Serial No. 600,824

4 Claims. (Cl. 104—172)

The present invention relates in general to motor vehicle maintenance devices and in particular to a servicing device adapted to handle a large volume of vehicles to be lubricated.

Generally, lubrication of motor vehicles has heretofore been carried out on hoists in service stations whose primary function is the sale of gasoline. The steps involved in lubrication do not actually consume much time but even if the mechanic's undivided attention is given to the job, so much time must be devoted to merely positioning the car on the hoist that the job is excessively long. In addition, but one vehicle at a time can be accommodated on a hoist and each step in the lubrication must be carried on while the vehicle is on the hoist. This makes it impractical to have different steps carried on simultaneously or at different work stations which are remote from one another. It is thus apparent that hoists are not adapted to handle high work volume. Complete lubrication of a vehicle should deprive its owner of its use for no more than 15 minutes, but in the ordinary service station, where it is worked on only between sales of gasoline, the job usually means loss of use of the car for a day, or a great portion of the day.

In order to decrease the time consumed in lubrication, elongate pits over which the vehicle is drawn have been used for an "assembly-line" type of service. Some time can be saved in an establishment of this type but this type of construction also has disadvantages which prevent attainment of high volume, low cost production. If any wheel or tire service is ordered by the customer it cannot be readily accomplished over a pit since the vehicle is ordinarily supported on its own wheels and rolled over the pit. Therefore, the vehicle cannot be completely serviced by one substantially continuous sequence of operations but must be taken to another work area after leaving the pit. Pit servicing is satisfactory for minimum servicing such as oil change and chassis lubrication, but is not versatile enough to handle all normal maintenance procedures quickly and efficiently. Another disadvantage, from the standpoint of customer satisfaction, is the fact that the servicing steps cannot be observed.

An object of the present invention is to provide a vehicle servicing device that can handle a large volume of vehicles to be lubricated so as to reduce the cost of lubrication.

Another object of my invention is to provide a device of this type which is adapted to support a vehicle in such a way that all normal lubrication, wheel and tire services can be accomplished thereon so that both limited and complete lubrication, as ordered, can be quickly accomplished.

It is also an object of the invention to furnish a device of this character having means to easily align a vehicle therewith in order to eliminate difficulty in positioning a vehicle prior to lubrication.

Yet another object of my invention is to provide a conveyor type of servicing system adapted to handle a substantially continuous flow of vehicles. To this end a novel means of removably supporting a vehicle on the conveyor is provided.

The invention also has for an object the provision of a device that will support a vehicle in such a way as to relieve its wheel suspension of the vehicle's weight so that lubricant injected therein will penetrate deeply into all bearings, pockets and the like.

These and other objects and advantages of my invention will readily be apparent from the following description of a presently preferred form thereof when taken in connection with the annexed drawings, in which:

Figure 2 is a partial top plan view, partly broken away, of the device of Figure 1;

Figure 3 is a vertical sectional view of the part of the device shown in Figure 2;

Figure 1:
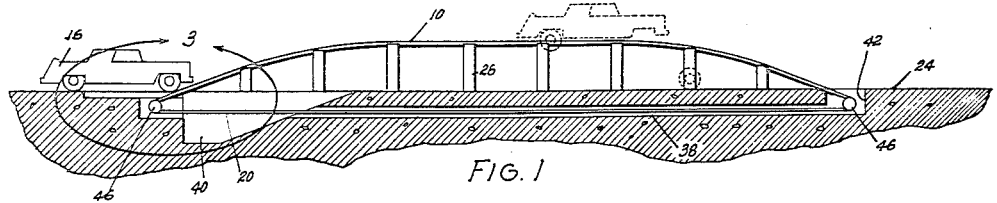
Figure 1 is a schematic side elevation of a preferred embodiment of my invention.

Referring to the drawings for the general arrangement of my invention and in particular to Figures 1 and 3, there will be seen an elongate ramp 10 which is centrally elevated. At the left end, or entrance to ramp 10, is a vehicle receiving platform 12. This platform is laterally movable to align a vehicle thereon with ramp 10. Wheel receiving members 14 on the forward end of platform 12 can then be elevated so that the front overhang of a vehicle 16 will clear the upwardly inclined entrance of the ramp 10. The platform 12 is then moved forwardly to a position where the front end of the vehicle chassis will engage a pair of support blocks 18 carried on opposite sides of ramp 10. Conveyor belt means 20 drivingly engage the blocks 18 to carry vehicle 16 onto ramp 10, a pair of blocks 18 also being placed under the rear end of the chassis.

Figure 4:
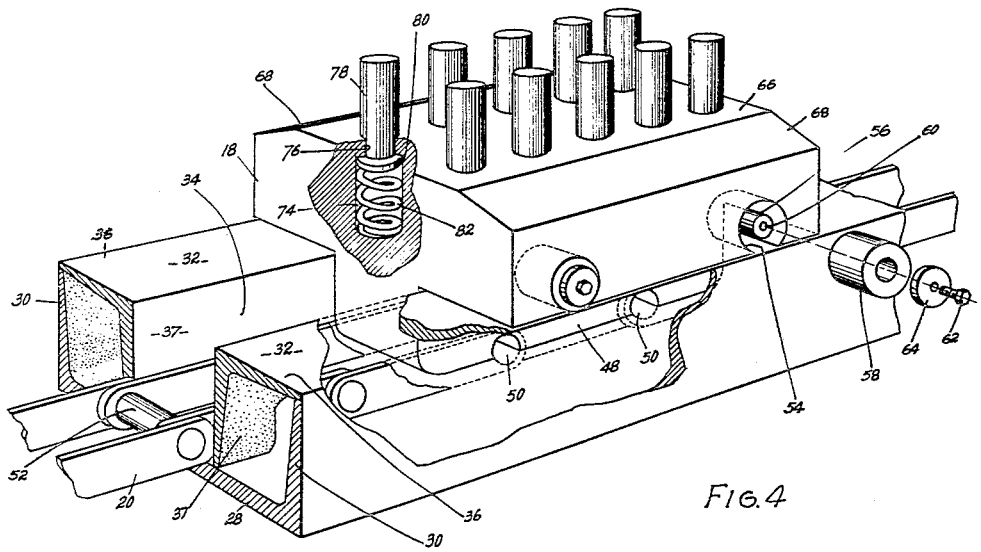
Figure 4 is a perspective view, on enlarged scale, of the vehicle support means of the invention, with parts thereof cut away and other parts shown in exploded perspective.
Figure 5:
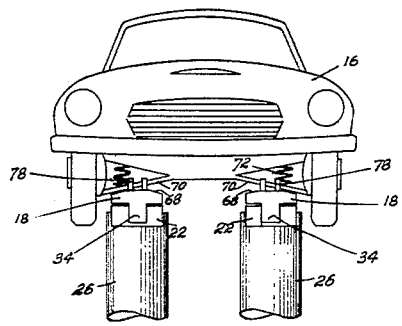
Figure 5 is an end view showing an automobile carried on ramp means of the invention.

In particular, ramp 10 is defined by a pair of parallel tracks 22, which can best be seen in Figures 2 and 4. Each track at its ends is at or below a ground surface 24 with its upwardly arched intermediate portion rigidly supported by a row of columns 26. The elevated central part of each track extends horizontally for a distance sufficient to accommodate one or two vehicles, as desired, at convenient working height above ground surface 24. The tracks 22 are laterally spaced apart less than the spacing between the wheels of vehicle 16, as can be seen in Figure 5.

Each of the tracks 22 is preferably of the construction shown in Figure 4. The base of the track is a channel-shaped member 28 that is rigidly fastened by anchor bolts, welding or the like, to the tops of columns 26. Channel 28 is relatively broad and is disposed with its opposite walls 30 extending upwardly. Between channel walls 30 a pair of angle beams 32 are positioned to define in track 22 a central, longitudinally extending way or slot 34 that opens upwardly. One leg 36 of each beam 32 is disposed horizontally with its outer edge joining the upper edge of a channel wall 30 while the other leg 36 of each beam extends vertically downward to rest on the web of channel 28. The beams 32 are rigidly fastened to channel 28 by any convenient means such as welding.

As has been previously noted, the entrance and exit ends of tracks 22 extend beneath the ground surface 26 on which the device is disposed. Referring now to Figure 1 it can be seen that beneath each track 22 there is formed a conduit 38 in which the lower flight of link belt 20 is suspended. At the entrance end of ramp 10, the conduit 38 opens into a working and oil drain pit 40 and at the exit end of the ramp, the conduit opens into a depression 42. In Figures 2 and 3, it will be observed that a shaft 44 is journaled in the pit 40 adjacent the entrance end of tracks 22 which rigidly mounts a pair of sprockets 46, each of which is in alignment with one of tracks 22 and a conduit 38. Another pair of sprockets 46 and shaft 44 are similarly mounted in depression 42 at the exit end of ramp 10. Power means (not shown) are connected to one of shafts 44 to drive the sprockets.

A pair of link chains 20 is mounted between each pair of sprockets 46, to be driven thereby in unison. The upper flight of each chain is carried on one of tracks 22 in the manner shown in Figure 4. Chain 20 rides in the bottom of slot 34 where it is engaged by blocks 18 in a manner presently to be described.

Each block 18 is substantially T-shaped in cross-section and is sufficiently long to accommodate the largest vehicle wheel suspension means likely to be encountered. On its lower side, the block is formed with a central, longitudinally extending rib 48 of less width than slot 34 of track 22. This rib has a plurality of semicircular cavities 50 extending transversely across its lower face that are adapted to receive pins 52 of chain 20.

On each of its side portions, block 18 has a pair of downwardly opening wheel or roller-bearing housings 54. Rigidly secured to the block in each of housings 54 is a stub-shaft 56 on which a roller bearing 58 is mounted. Each shaft 56 is provided with a tapped bore 60 that receives a bolt 62 on which a washer 64 is mounted. This construction is seen in exploded perspective in Figure 4. As is apparent, blocks 18 could simply be slidably supported by horizontal legs 36 of beams 32 but the use of the roller bearing means just described will greatly reduce frictional resistance to movement of the blocks along tracks 22.

The upper surface 66 of each block 18 is beveled on each side, as at 68. As can be seen in Figure 5, the beveled surfaces 68 are adapted to accommodate the lower control arm 70 of the vehicle front suspension 72 and any block 18 may be used under either the left or right side of the vehicle. When blocks 18 are used to support the rear end of the vehicle chassis, the rear axle housing will be supported on horizontal upper surfaces 66 of the blocks.

Each block 18 on its upper surface 66 is provided with means to removably engage either the front or rear vehicle suspension. These means can best be seen in Figure 4.

Block 18 has two longitudinally extending parallel rows of spring pockets 74 each of which opens upwardly into upper surface 66 through a bore 76 of reduced diameter. Vertically slidably mounted in each bore 76 is a pin 78 having an outwardly extending annular flange 80 rigidly affixed to its lower end. A compressed helical spring 82 is housed in each pocket 74 to yieldably urge pin 78 into upwardly protruding position.

It will be noted that each pin 78 acts independently and although depressible into a pocket 74, is laterally immovable. Accordingly, when the block is placed under a part of the vehicle chassis, only those pins 78 that are contacted by the wheel suspension means are depressed by the weight of the vehicle. Other pins 78, both fore and aft of the wheel suspension means, will remain in upwardly protruding position to prevent sliding of vehicle 16 on blocks 18. For example, as can be seen in Figure 5, lower control arms 70 of front wheel suspension means 72, have fully or partially depressed some pins 78 but are immovably held between other fully protruding pins 78. Thus, when vehicle 16 is moving upwardly at the entrance portion of ramp 10 and moving downwardly at the exit portion, there is no danger of its sliding on blocks 18.

It will be seen that when the vehicle is resting on blocks 18, its front wheels, king pins, steering knuckles and associated supports are relieved of the vehicle's weight. Therefore, when lubricant is injected into the related fittings it will penetrate deeply to fully lubricate this critically important section of the front suspension.

The manner in which a vehicle is loaded onto blocks 18 to be conveyed across tracks 22 for servicing can best be seen in Figures 2 and 3.

Vehicle receiving platform 12 is substantially rectangular and large enough to handle the largest vehicle expected to be received by my invention. As has been noted, platform 12 is disposed in front of the entrance end of ramp 10 substantially at ground level so that a vehicle can be driven directly onto it. Referring now to Figure 3, it will be seen that a plurality of ball bearing holders 84 are rigidly affixed to ground surface 24 under the outer edge portions of platform 12. This platform can thus be freely moved both laterally and longitudinally to control the position of a vehicle 16 thereon relative to tracks 22.

Approximately beneath the center of platform 12 in a shallower portion 86 of pit 40 is located hydraulic and electrical means for moving platform 12. On the bottom of the platform near its rear end are a pair of brackets 88 that rigidly support a shaft 90 extending transversely of platform 12. Similar brackets 92 are anchored to the ground in shallow pit 86 forwardly of the first mentioned brackets 88. Brackets 92 also support a shaft 94 to which one end of a hydraulic cylinder 96 is connected. A piston rod 98 extends from the other end of cylinder 96 to slidably receive shaft 90 in a bore formed in its outer end. Hydraulic power and control means (not shown) are provided that can be manipulated by an operator standing in pit 40 to move platform 12 longitudinally.

Means to move platform 12 laterally is shown in Figure 2. Rigidly affixed to the bottom side of the platform adjacent an edge is a transversely extending rack 100 that slidably engages an elongate splined shaft 102. The shaft 102 is mounted between brackets 104 (only one of which is shown) anchored to the ground in shallow pit 86 and is driven by a motor 106 through reduction gears 108. The motor can be controlled remotely by means (not shown) from the operator's position in pit 40.

As is indicated by the arrows in Figures 2 and 3, the construction just described permits platform 12 to be moved both laterally and longitudinally. When motor 106 is activated to drive splined shaft 102, the sliding connection of shaft 90 and piston rod 98 permits lateral movement of the platform to either side of center for a distance equal to half the length of shaft 90. Similarly, the sliding connection of splined shaft 102 and rack 100 permits longitudinal movement equal to the length of piston rod 98. As will presently appear, the movable platform 12 greatly increases the speed and ease of aligning vehicle 16 with tracks 22 and loading it onto blocks 18.

Referring now to Figure 2, it will be noted that a wheel receiving member 14 is connected to each side of platform 12 to protrude forwardly therefrom. Each member 14 is connected to the platform by a link member 110. The member 110 at its rear end has piano hinge means fastening it to the platform and at its forward end has piano hinge means connecting it to wheel receiving member 14. As Figure 3 shows, each member 14 is formed with a wheel well 112 adapted to receive a front wheel of vehicle 16.

A portion of the left side of platform 12 and the adjacent link member 110 and wheel receiving member 14 have been cut away in Figure 2 to show the hydraulic means to elevate the front end of a vehicle spotted on platform 12. Although not shown on the drawing, it is to be understood that such means are also located under member 14 on the opposite side of the platform and both hydraulic lifts are connected to a common source of hydraulic pressure to be actuated simultaneously and to raise or lower in unison.

The hydraulic means for elevating member 14 is best seen in Figure 3. Under each wheel well 112 is fastened a bracket 114 to which a link bar 116 is pivotally connected at one of its ends. The other end of bar 116 is pivotally connected to another bracket 118 fastened to the underside of platform 12 just rearwardly of link member 110. In lowered position, the link member 110 and member 14 are supported at ground level on ball bearing mounts 84 in substantially the same plane as platform 12. In elevated position, as is shown in phantom line, link member 110 and link bar 116 serve to maintain wheel receiving member 14 in horizontal attitude.

Bracket 118 also supports one end of a hydraulic cylinder 120. Protruding from the other end of the cylinder 120 is a piston rod 122 whose outer end is pivotally connected to a small bracket 124 that is rigidly affixed to the under side of link member 110, near its forward end. As is apparent, the extent to which piston rod 122 is forced out of cylinder 120 under hydraulic pressure will determine the elevation of member 14. A foot pedal 126, or the like, is provided in the operator's position in pit 40 to control hydraulic cylinders 120.

With a crew of 3 or 4 specialized operators my servicing invention can accommodate a substantially continuous flow of vehicles. For ordinary lubrication not involving wheel service a car would be processed from entrance to exit of ramp 10 in about 10 minutes. If complete lubrication is ordered, no more than 15 minutes should pass before the vehicle leaves the ramp.

Prior to being driven onto platform 12, various pre-services would be performed on car 16. The generator, distributor, steering sector and throttle linkage would be oiled. Door and hood latch lubrication and cleaning, filter change and other underhood services would likewise be complete.

Car 16 is then driven onto platform 12 with its front wheels spotted in wheel wells 112. A second operator standing in pit 40 then loads it onto tracks 22. This operator, by controlling motor 106, first moves platform 12 laterally to left or right until car 16 is centered relative to the tracks. Foot pedal 126 is then depressed to cause the front end of the car to be elevated by cylinders 120. Elevating the front end is particularly important in vehicles having a long front overhang to avoid contact between the front bumper and tracks 22.

After elevation of the car's front end, one of the blocks 18 is placed on each track 22 at positions opposite one another at the entrance end of the tracks. Hydraulic cylinder 96 is then actuated to move platform 12 forwardly. When the vehicle's front wheel suspension is positioned vertically above the blocks 18, foot pedal 126 is again depressed to actuate cylinders 120 for lowering each front wheel suspension means 72 onto approximately the center of one of the blocks 18. The lower control arm 70 of each suspension will then be held in non-slidable engagement by pins 78 in the manner previously described.

After the front end of the car chassis has been loaded onto blocks 18, the operator then actuates the means (not shown) for driving belts 20. The car's weight on blocks 18 keeps them in forceful engagement with the link belts so that car 16 is moved forwardly up the entrance portion of ramp 10. When the rear axle housing of car 16 is at the entrance end of tracks 22, the belts 20 are stopped to arrest the motion of the car. Another pair of blocks 18 is then spotted under the axle housing on tracks 22. The pit operator then starts the crank case, transmission and differential drains, as ordered, while a surface operator removes the front wheels, if a wheel pack is ordered. The pit operator again starts belts 20 and assuming the second pair of blocks 18 to have been correctly spotted, they will be removably engaged by the rear axle housing as the vehicle moves forwardly over tracks 22.

When the car 16 has reached the horizontal, elevated portion of the ramp, belts 20 are stopped. The pit operator then prepares to receive another vehicle on platform 12. Concurrently, a surface operator accomplishes chassis lubrication, replaces all drain plugs, and refills the transmission and differential, if ordered. This phase of lubrication will have been completed by the time another car has been spotted on platform 12 and aligned with tracks 22.

When the pit operator has loaded the next car on tracks 22, the front car 16 will have been moved to the exit portion of ramp 10. Here the crankcase will be refilled, front wheels replaced and cleaning operations carried on. After these have been completed, the vehicle will be ready to roll off of ramp 10 onto ground surface 24 with the next movement of belts 20. As the vehicle leaves tracks 22, blocks 18, on reaching the exit will drop into depression 42 from which point they can be retrieved and returned to the pit operator.

It will be apparent that various modifications and changes may be made with respect to the above described embodiment of my vehicle servicing device without departing from the spirit of the invention or the scope of the following claims.

I claim:

1. A vehicle servicing device comprising: a stationary ramp defined by a pair of aligned tracks each of which has an elevated portion between ground level entrance and exit ends thereof; a vehicle receiving platform adjacent the entrance to said ramp; a wheel receiving member on each side of said platform and extending forwardly therefrom with the tracks of said ramp positioned therebetween; means connecting each of said members to said platform for vertical movement of said members; means connected to said members to elevate said wheel receiving members in unison; means engaged with said platform to move said platform laterally and longitudinally to bring a vehicle thereon into alignment with said ramp; and conveyor means on said ramp that are removably engageable by the chassis of said vehicle to move it from the entrance to the exit of said ramp.

2. A vehicle servicing device, comprising: a stationary ramp defined by a pair of aligned tracks each of which has an elevated portion between ground level entrance and exit ends thereof; a pair of endless link belts each of which is suspended beneath one of said tracks with its upper flight movably supported by said track; means to drive said pair of belts in unison; a vehicle receiving platform at the entrance to said ramp; a wheel receiving member on each side of said platform and extending forwardly therefrom with the entrance ends of said tracks positioned therebetween, each of said members being formed with a wheel well; link means connecting each of said members to said platform to horizontally support said member during vertical movement thereof, said member being normally disposed in ground level co-planar relationship with said platform; means connected to said members to elevate said members; means connected to said platform to move said platform laterally to bring a vehicle thereon into alignment with said tracks; means connected to said platform to move said platform longitudinally to bring the elevated front end of said vehicle to a position above the entrance end of said tracks; and a plurality of support blocks movably mounted on each of said tracks to removably engage the chassis of said vehicle and each of which is drivingly engaged by links of one of said belts to carry said vehicle along said ramp.

3. A device as set forth in claim 2 in which a pit is formed beneath the entrance portion of said ramp.

4. A vehicle servicing device, comprising: a rigidly supported ramp having an elevated portion between ground level entrance and exit ends thereof, said ramp being defined by a pair of elongate parallel tracks each of which has a longitudinally extending center slot formed in the upper face thereof; a pair of endless link belts, each of which is suspended beneath one of said tracks to have its upper flight removably supported in said slot of said tracks; a laterally and longitudinally movable vehicle receiving platform at the entrance to said ramp; means on said platform to elevate the front end of a vehicle disposed thereon; a plurality of support blocks on each of said tracks, each of said blocks being of substantially T-shaped cross section to include a downwardly protruding rib that slidably engages the slot of said track and releasably engages links of said belt; a plurality of laterally spaced apart pins slidably mounted in vertically extending bores formed in the upper face of each of said blocks; spring means urging each of said pins upwardly; means limiting the extent to which said pins protrude upwardly above each of said blocks; wheel means supporting each of said blocks on one of said tracks; and means to drive said pair of belts in unison.

References Cited in the file of this patent

UNITED STATES PATENTS

| | | |
|---|---|---|
| 369,429 | Brooke | Sept. 6, 1887 |
| 1,335,969 | Hughes | Apr. 6, 1920 |
| 1,445,394 | Harvey | Feb. 13, 1923 |
| 1,722,818 | Mugler | July 30, 1929 |
| 1,876,307 | Langbein | Sept. 6, 1932 |
| 2,065,107 | Turner et al. | Dec. 22, 1936 |
| 2,511,316 | Cody | June 13, 1950 |
| 2,533,981 | Weaver | Dec. 12, 1950 |
| 2,566,863 | Voigt | Sept. 4, 1951 |
| 2,581,137 | Pelouch | Jan. 1, 1952 |
| 2,643,010 | Hott et al. | June 23, 1953 |
| 2,734,597 | Pelouch | Feb. 14, 1956 |

FOREIGN PATENTS

| | | |
|---|---|---|
| 913,354 | Germany | July 8, 1949 |
| 453,902 | Great Britain | Sept. 21, 1936 |
| 689,896 | Great Britain | Apr. 8, 1953 |
| 707,789 | Great Britain | Apr. 21, 1954 |